(12) United States Patent
Niguet et al.

(10) Patent No.: US 8,183,484 B2
(45) Date of Patent: May 22, 2012

(54) DETECTION DEVICE AND SEAT COMPRISING ONE SUCH DEVICE

(75) Inventors: Ludovic Niguet, Valence (FR); Christian Roux, Montmeyran (FR); Stéphane Collot, Chateaudouble (FR)

(73) Assignee: Crouzet Automatismes, Valence (FR)

( * ) Notice: Subject to any disclaimer, the term of this patent is extended or adjusted under 35 U.S.C. 154(b) by 335 days.

(21) Appl. No.: 12/530,758

(22) PCT Filed: Feb. 5, 2008

(86) PCT No.: PCT/FR2008/000131
§ 371 (c)(1),
(2), (4) Date: Sep. 10, 2009

(87) PCT Pub. No.: WO2008/113902
PCT Pub. Date: Sep. 25, 2008

(65) Prior Publication Data
US 2010/0090506 A1    Apr. 15, 2010

(30) Foreign Application Priority Data

Mar. 13, 2007  (FR) ...................................... 07 01804

(51) Int. Cl.
*H01H 3/20* (2006.01)
(52) U.S. Cl. ...................................................... 200/330

(58) Field of Classification Search ................... 200/330, 200/406, 61.89, 86.5, 302.2, 516, 61.54
See application file for complete search history.

(56) References Cited

U.S. PATENT DOCUMENTS

| 3,921,750 | A | | 11/1975 | Shames | 180/103 |
| 4,934,735 | A | * | 6/1990 | Embach | 280/731 |
| 6,008,460 | A | * | 12/1999 | Demari | 200/406 |

FOREIGN PATENT DOCUMENTS

| DE | 66 03 334 | 9/1969 |
| DE | 34 05 652 | 8/1985 |

* cited by examiner

*Primary Examiner* — Edwin A. Leon
(74) *Attorney, Agent, or Firm* — Steptoe & Johnson LLP (57) ABSTRACT

A detection device having a body including an electric contact with at least two electric operating states, and a movable operating device having at least two operating positions. The movable operating device is connected to the body by a sliding connection permitting translational movement of the movable operating device, and a connection permitting the operating device, to swivel with respect to the body. A change of position of the movable operating device actuates the electric contact. The swivel connection is between the movable operating device and the body, and the movable operating device actuates the change of electric operating state of the electric contact by pressing directly on a contact surface of the electric contact.

20 Claims, 5 Drawing Sheets

Fig. 1 (STATE of the ART)

Fig. 2 (STATE of the ART)

Fig. 3 (STATE of the ART)

Fig. 4 (STATE of the ART)

DETECTION DEVICE AND SEAT COMPRISING ONE SUCH DEVICE

This application is a national stage entry of International Application No. PCT/FR2008/000131, filed Feb. 5, 2008 designating the U.S., which claims the benefit of French Application No. 0701804, filed Mar. 13, 2007.

BACKGROUND OF THE INVENTION

The invention relates to a detection device comprising a body comprising an electric contact with at least two electric operating states. The detection device comprises a movable operating device having at least two operating positions connected to the body by a sliding connection enabling movement of the movable operating device in translation with respect to the body and by at least one swivel connection enabling the operating device to swivel with respect to the body around at least one pressing point. A change of position of the movable operating device is designed to actuate the electric contact device.

The invention also relates to a seat comprising at least one deformable seating surface designed for a passenger to sit on. The seat comprises a rigid frame designed to be fixed to a vehicle and comprising at least one detection device placed in the seat so as to detect deformations of said seat.

STATE OF THE ART

A large number of solutions enable the presence of objects or bodies on a support to be detected. Electromechanical detection devices for detecting persons or objects on seats in particular exist, more particularly on automobile vehicle seats.

As represented in FIGS. 1 to 4, state-of-the-art detection devices essentially comprise an electric contact 3 placed between two elements 1, 2, at least one of which is movable with respect to the other. The first element 1 is composed of a body such as a casing. The second element 2 is composed of an operating means such as a push-button. The electric contact 3 is generally placed inside the casing. The electric contact 3 comprises at least two electric states, open or closed. Each electric state of said contact corresponds to one of the operating positions of the first and second elements 2, 3 and therefore to an active or inactive detection state of the detection device. Movement of the push-button inside the casing generally causes a change of electric state of the contact 3 after a displacement travel. Intermediate actuating means can be used to transmit the movement of the push-button to the electric contact 3.

In the case of detection of a passenger on a vehicle seat, the detection device can be positioned under the seating surface of the vehicle seat. As soon as the passenger sits on the seat, the seat is deformed and generates an actuating force applied on an actuating surface of the push-button. The push-button moves by sliding inside the hollow casing and switches the detection device contact. The contact, generally in an open state, switches to a closed state. A closing signal is then provided to processing means.

Satisfactory operation of this type of electromechanical solution is greatly dependent on the geometrical positioning of the application point of the actuating force applied on the actuating surface of the operating device 2.

Figure 1:
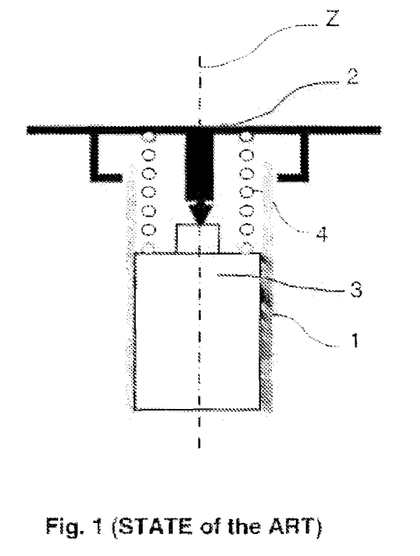
FIGS. 1 to 4 represent schematic views of a detection device according to a known embodiment.
Figure 2:
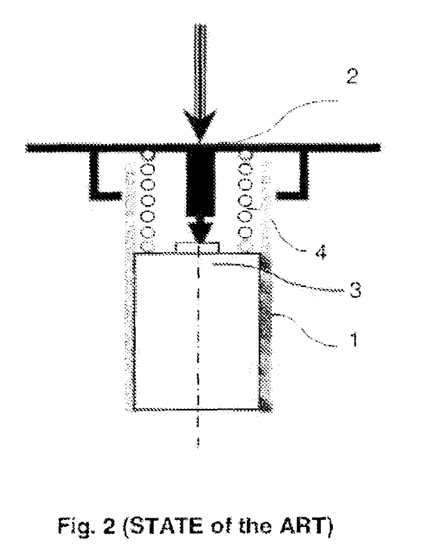

As represented in FIG. 2, the detection device is in fact particularly efficient when the actuating force FA is applied in the direction of an axis of movement Z of the operating device.

Figure 3:
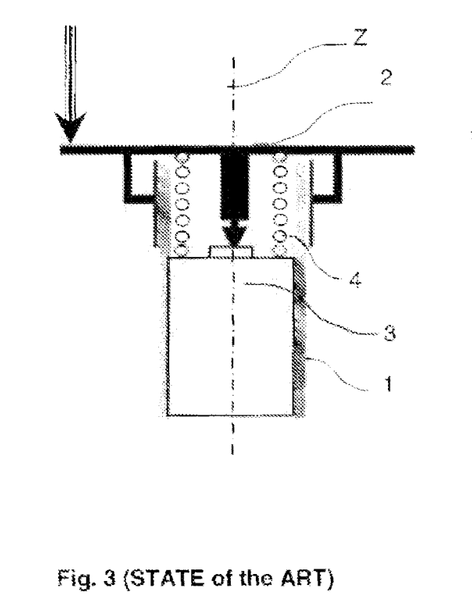
Figure 4:
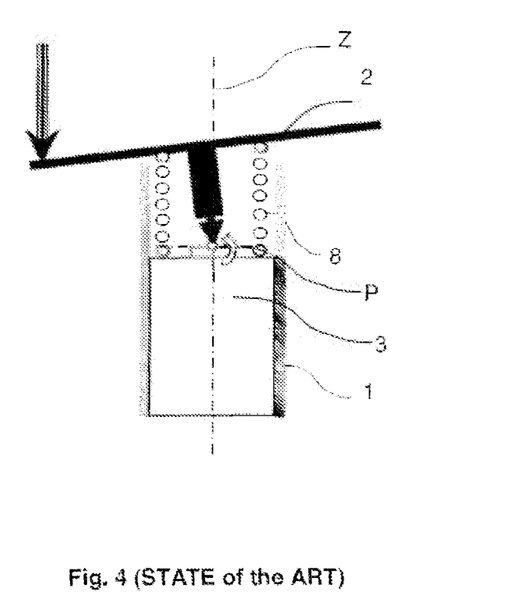

When the actuating force FA, as represented in FIG. 3, is off-centre with respect to the axis of movement Z of the push-button, a great deal of friction is generated at the level of the guiding surface between the push-button and casing and may even go as far as blocking the mechanism. This friction is in particular due to butting problems. The detection level of the detection device is then not the same depending on the application point of the actuating force on the push-button. This variation of the detection level for the same actuating force is not tolerable for certain applications, in particular in the case of detection of a passenger on the vehicle seat.

To remedy butting problems, efficient guiding means can be used. Construction of the detection device then requires the use of a resistant and costly material and of optimized guiding means. These modifications result in large overall dimensions. The solution described in Patent EP11707P4 comprises numerous intermediate actuating means between the operating device and electric contact. This type of detection device is therefore complex to achieve. Furthermore, the size of the detection devices described above is generally large.

SUMMARY OF THE INVENTION

The object of the invention is therefore to remedy the shortcomings of the state of the art so as to propose a detection device with a detection threshold that is not dependent on the application point of the actuating force.

Said at least one pressing point according to the detection device is positioned between the movable operating device and the body. The movable operating device is designed to actuate the change of electric operating state of the electric contact by pressing directly on a contact surface of said electric contact.

Advantageously, said at least one pressing point of said at least one swivel connection is off-centre with respect to an axis of movement.

Advantageously, the movable operating device comprise an operating device one end of which is designed to collaborate with the contact surface at the level of a contact area to actuate the change of electric operating state of said electric contact.

According to one embodiment of the invention, a first distance between the contact area and said at least one pressing point is greater than a second distance between said at least one pressing point and the axis of movement, said distances corresponding to the actual distances projected onto a plane perpendicular to the axis of movement.

According to one embodiment of the invention, a first distance between the contact area and said at least one pressing point is smaller than a second distance between said at least one pressing point and the axis of movement, said distances corresponding to the actual distances projected onto a plane perpendicular to the axis of movement.

According to a development of the invention, a third distance between the contact area and said at least one pressing point in a plane parallel to the axis of movement is zero.

According to a development of the invention, a third distance between the contact area and said at least one pressing point in a plane parallel to the axis of movement is greater than zero.

In one particular embodiment, the contact surface is perpendicular to the axis of movement.

In another particular embodiment, the contact surface is inclined with respect to the axis of movement.

The contact surface is preferably of concave shape.

The contact surface is preferably of convex shape.

The contact surface is advantageously of conical shape.

The movable operating device is advantageously connected to the body by at least four pressing points respectively each allowing said movable operating device to swivel with respect to the body on a swivel connection.

The pressing points between the operating device and body are preferably arranged uniformly over the periphery of the body.

The movable operating device advantageously comprises a flange pressing on a rim of the body and enabling said movable operating device to swivel with respect to the body.

The movable operating device is advantageously held in a first operating position with respect to the body by holding means, said holding means exerting a retaining force opposing movement of the operating device with respect to the body from the first operating position to a second operating position.

The holding means preferably comprise a spring.

The holding means preferably exert the retaining force on the movable operating device by means of the contact surface of the electric contact.

The invention relates to a seat comprising at least a deformable support surface for a passenger to sit on, and a rigid frame designed to be fixed to a vehicle. At least one detection device as defined above is placed in the seat so as to detect deformations of said seat.

Said at least one detection device is advantageously secured under the seating surface of the seat by securing means, the seating surface comprising a deformable surface commanding movement of the movable operating device with respect to the body to the second operating position.

The deformable surface is advantageously in contact with the movable operating device.

In a particular embodiment, the seat comprises a backrest in which a detection device is positioned to detect a deformation of a first part of the backrest with respect to a second part of the backrest.

BRIEF DESCRIPTION OF THE DRAWINGS

Other advantages and features will become more clearly apparent from the following description of a particular embodiment of the invention given for illustrative and non-restrictive example purposes only and represented in the accompanying drawings in which.

DETAILED DESCRIPTION OF AN EMBODIMENT

Figure 5:
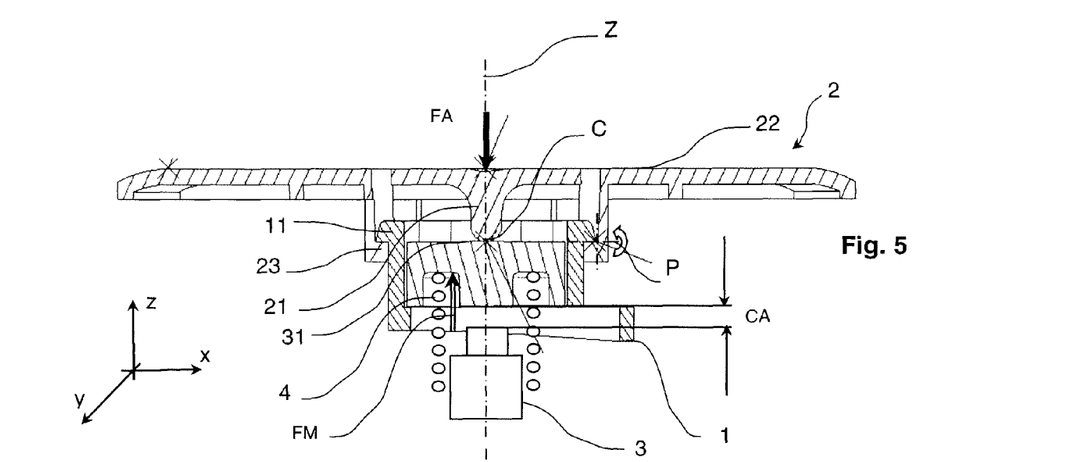
FIG. 5 represent a schematic view of a detection device according to a first preferred embodiment of the invention.

According to a first preferred embodiment presented in FIG. 5, the detection device comprises a body 1 and a movable operating device 2.

The movable operating device 2 is connected to the body by a first sliding connection allowing movement of the movable operating device 2 in translation with respect to the body 1 along an axis of movement Z.

The movable operating device 2 is connected to the body by at least one swivel connection enabling the operating device 2 to swivel with respect to the body 1. Each swivel connection is characterized by a pressing point P between the operating device 2 and body 1. According to the embodiments of the invention, the movable operating device 2 is connected to the body 1 by at least one pressing point P enabling movable operating device 2 to swivel with respect to body 1.

Said at least one swivel connection is preferably off-centre with respect to the axis of movement Z. In other words, the pressing points P between the movable operating device 2 and body 1 are preferably off-centre with respect to the axis of movement Z.

An electric contact 3 having at least two electric operating states is positioned inside the body 1. Movement of the operating device 2 between a first and second operating position actuates the electric contact 3 from a first electric state to a second electric state. The detection device then switches from an active detection state to an inactive detection state or vice-versa.

An actuating travel CA is defined corresponding to the minimum travel necessary for said device to change detection state.

According to one embodiment, body 1 is formed by a hollow casing. The casing is in the shape of a hollow tube. The tube has a preferably cylindrical cross-section. The longitudinal axis of the body is generally identical to the axis of movement Z of movable operating device 2.

The movable operating device 2 is in the form of a push-button able to move with respect the casing.

The movable operating device 2 comprises an operating means 21 one end of which is designed to collaborate via at least one contact area C with a contact surface 31 of the electric contact 3. Movement of the operating means 21 is designed to actuate said electric contact. According to the embodiments represented, said end of the operating means 21 is continuously in contact with the contact surface 31 of the electric contact 3. The contact area C is moreover preferably punctual.

The movable operating device 2 comprises an operating surface 22 on which the actuating forces FA of the detection device are applied. The operating surface extends beyond the body 1 in at least one direction.

Figure 6:
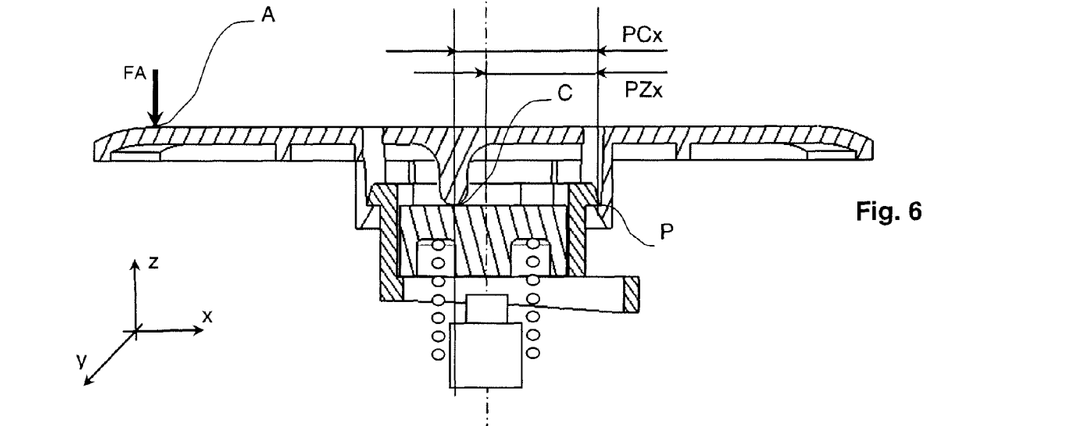
FIGS. 6 to 7 represent schematic views of a detection device according to two other preferred embodiments of the invention.
Figure 7:
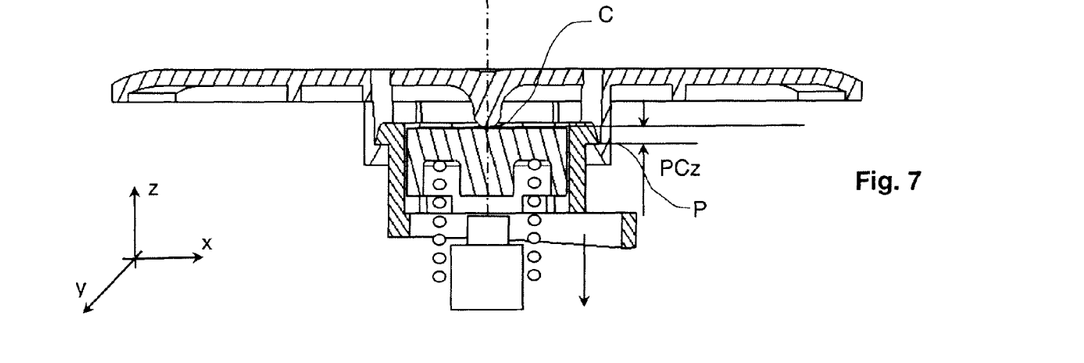

According to one embodiment as represented in FIGS. 5 to 7, the operating means 21 comprises a rod pressing on the bearing surface 31 of the electric contact 3. The contact surface 31 is securely attached to the electric contact 3 at the level of the contact area C.

The movable operating device 2 actuates the change of electric state of the electric contact 3 by moving the contact surface 31 of said electric contact. The contact surface 31 then moves by a distance equal to the actuating travel CA.

According to a preferred embodiment of the invention, the movable operating device 2 is connected to the body 1 by at least four pressing points P. Each pressing point P allows said movable operating device 2 to swivel with respect to the body 1 on a swivel connection. Pressing points P are arranged uniformly over the periphery of the body 1.

The movable operating device 2 comprises a flange 23 pressing on the body 1. Flange 23 is fitted on the periphery of the movable operating device 2.

To increase the number of pressing points P and therefore the number of swivel connections, the flange 23 is preferably pressing on a rim 11 placed on the periphery of the body. The positioning of the flange 23 on the rim 11 then allows the movable operating device 2 to swivel with respect to the body 1 around several swivel connections. The set of swivel connections enables the movable operating device to swivel in numerous directions arranged uniformly around a circle.

The movable operating device 2 is held in a first operating position by holding means 4. Said holding means 4 exert a retaining force FM opposing movement of the operating device 2 with respect to the body 1 from the first operating position to a second operating position. The holding means 4 preferably comprise a coil spring.

Movement of the contact surface 31 by the action of an actuating force FA takes place against a retaining force FM essentially generated by the compression spring of the holding means 4.

Said compression spring preferably fitted in the body 1 exerts a retaining force tending to bias the operating device 2 to the first operating position called the rest position. According to this embodiment of the invention, the electric contact is then open and the detection device is in an inactive detection state. The holding means 4 can also exert the retaining force on the movable operating device 2 via the contact surface 31 of the electric contact 3.

According to a preferred embodiment of the invention as represented in FIG. 5, the pressing point P and the contact area C between the operating means 21 and the contact surface 31 are placed in the same plane XY. The contact area C, which is preferably punctual, is further placed on the axis of movement Z.

When an actuating force FA is applied to the movable operating device 2 in a direction that is substantially the same as the axis of movement Z, said operating means moves in translation with respect to the body 1. Movement takes place essentially along the axis of movement Z. This movement of the movable operating device 2 takes place against the retaining force FM exerted by the compression spring 4. After it has moved, the push-button reaches its second operating position and actuates the electric contact 3 which changes electric state. According to this embodiment of the invention, the electric contact is then closed and the detection device is in an active detection state. As soon as the actuating force is no longer applied, the detection device leaves the second operating position to reposition itself in the first operating position. The electric contact 3 will switch from a closed electric state to an open electric state.

Depending on the point of application and on the intensity of the actuating force FA on the operating surface 22 of the movable operating device 2, said device will move either in translation or by swivelling or in translation and with swivelling.

When the actuating force FA is applied in a different direction from the axis of movement Z, in other words when the actuating force FA is applied in a manner that is off-centre with respect to the axis of movement Z, said operating device will swivel with respect to the body 1 around a pressing point P. Swivelling of the operating device results in movement of the movable operating device 2 which will actuate the electric contact 3.

Swivelling of the movable operating device 2 combined with a leverage effect ensures efficient actuation of the electric contact 3.

The leverage effect is proportional to the ratio between on the one hand the distance PAx separating the application point of the actuating force FA at the actuating point A and the pressing point P and on the other hand the distance PCx separating the contact point C and the pressing point P. The two distances PAx, PCx are projected and measured in a plane XY perpendicular to the axis of movement Z. The greater the ratio of the distances PAx/PCx, the greater the leverage effect will be and the lower the actuating force FA useful for movement of the contact surface 31 will have to be.

Due to the leverage effect, the contact force FC applied at the level of the contact area C is greater than the actuating force FA. The contact force is then sufficient to oppose the retaining force FM and to generate movement of the contact surface 31 over the whole actuation travel. On account of the fact that the actuating force FA is transposed to the level of the contact area C, the butting effects are minimized.

Thereby, unlike a known detection device as represented in FIGS. 1 to 4, the frictions encountered by movement of the contact surface 31 do not depend on the application point A of the actuating force FA on the operating surface 22. Efficient detection takes place whatever the point of application of the actuating force FA on the operating surface 22 of the movable operating device 2.

When the movable actuating device 2 swivels around a pressing point P, the periphery of the contact surface 22 also moves in rotation with respect to this swivelling point. Movement of the periphery of the actuating device 2 projected in a direction parallel to the axis of movement Z is henceforth called the displacement AZ. For a fixed actuating travel CA, the displacement AZ is greater than the actuating travel CA on account of the leverage effect.

Depending on the type of use of the detection device, it is recommendable to obtain a more or less large displacement.

For example, it is desirable for the displacement AZ to be reduced when the detection device is positioned in a confined volume implying problems of available space. It may be desirable to reduce the displacement of the actuating device 2 when the travel of the actuating device producing the actuating force FA is limited.

It will on the other hand be recommendable for example to increase the displacement AZ when the travel of the actuating device producing the actuating force FA is great and when it is not desired to block their movement.

A first displacement factor Fd1 is defined. This first displacement factor Fd1 is equal to the ratio between two distances (Fd1=PCx/PZx). A first distance PCx is measured between the contact area C and pressing point P. A second distance PZx is measured between the pressing point P and axis of movement Z. These two distances PCx and PZx correspond to the actual distances projected onto the plane XY perpendicular to the axis of movement Z.

For a detection device according to an embodiment represented in FIG. 5, the first horizontal displacement factor Fd1 is equal to 1. The first distance PCx is in fact equal to the second distance PZx. The displacement AZ is then directly proportional to the leverage effect proportional to the ratio of the distances PAx/PCx.

As represented in FIG. 6, the first distance PCx being greater than the second distance PZx, the first displacement factor Fd1 increases and becomes greater than 1. According to this presented embodiment, the displacement AZ will tend to decrease.

On the other hand, if the displacement factor Fd1 decreases and becomes smaller than 1, the displacement AZ will tend to increase.

A second displacement factor Fd2 is defined. This second displacement factor Fd2 is dependent on the position of the pressing point P with respect to the contact area C in the direction of the axis of movement Z.

For a detection device according to an embodiment represented in FIG. 5, the second displacement factor Fd2 is equal to 0. The contact area C and pressing point P are in fact in the same plane XY perpendicular to the axis of movement Z. A third distance PCz between the two points C, P, projected in a plane XZ parallel to the axis of movement Z, is zero.

As represented in FIG. 7, the pressing point P is far from the contact area C in the plane of projection XZ. As the second displacement factor Fd2 increases, the displacement tends to decrease.

During swivelling of the movable operating device 2, the contact area C between the operating means 21 and the contact surface 31 of the electric contact will move.

This movement can take place along a substantially flat surface perpendicular to the axis of movement Z. As represented in FIG. 5, the contact surface 31 resumes the shape of a disk positioned perpendicularly to the axis of movement Z.

To increase or reduce the displacement AZ without modifying the leverage effect, the contact surface 31 can be inclined with respect to the axis of movement Z. This more or less large incline can be positive or negative depending on the effects sought for.

When the positioning of the flange 23 on the rim 11 enables the movable operating device 2 to swivel with respect to the body 1 in numerous directions arranged uniformly around a circle, the contact surface will preferably be convex or concave.

In this way, the incline of the contact surface with respect to the axis of movement Z, and the first and second displacement factors Fd1, Fd2, constitute parameter setting means enabling the displacement AZ to be adjusted.

Figure 10:
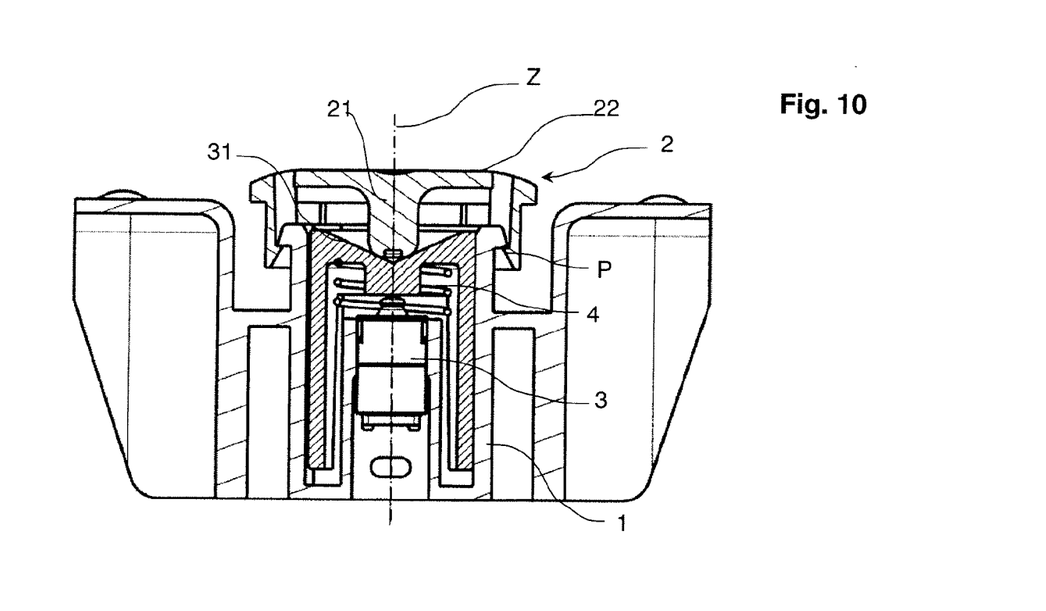
FIGS. 10 and 11 represent an alternative embodiment of a detection device according to FIGS. 5 to 7.
Figure 11:
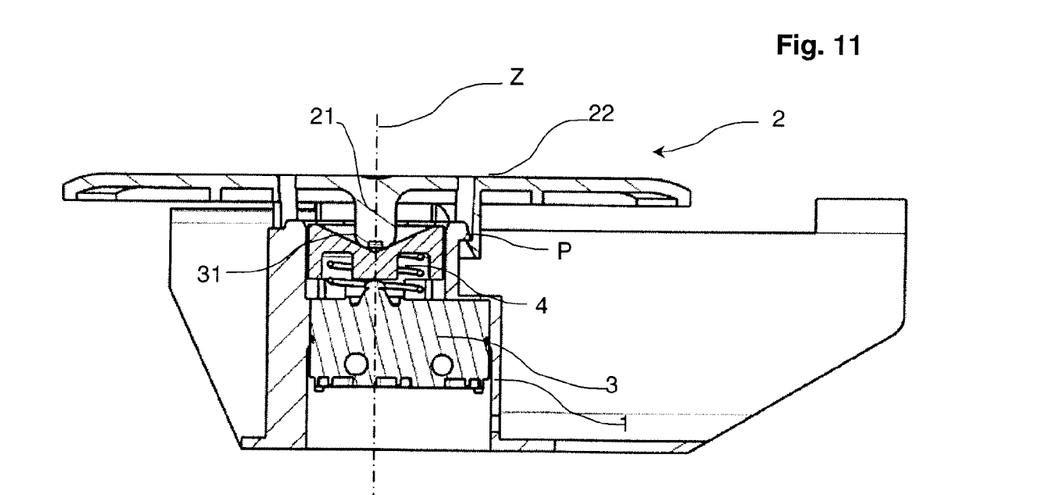
Figure 12:
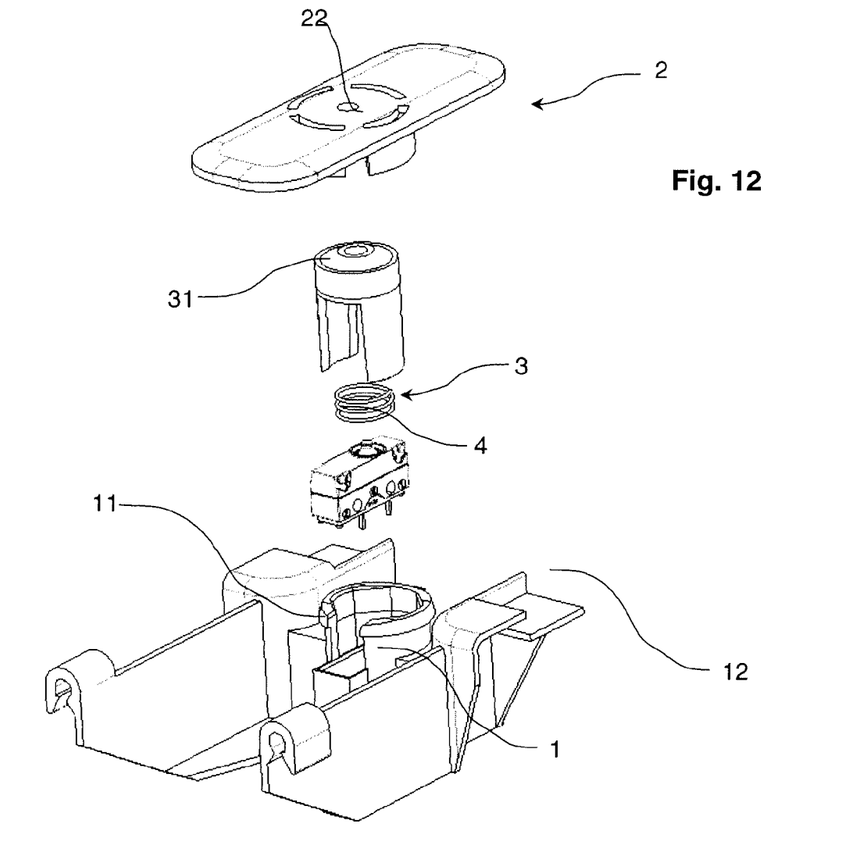
FIGS. 12 and 13 represent perspective views of the alternative embodiments of a detection device according to FIGS. 8 to 11.
Figure 13:
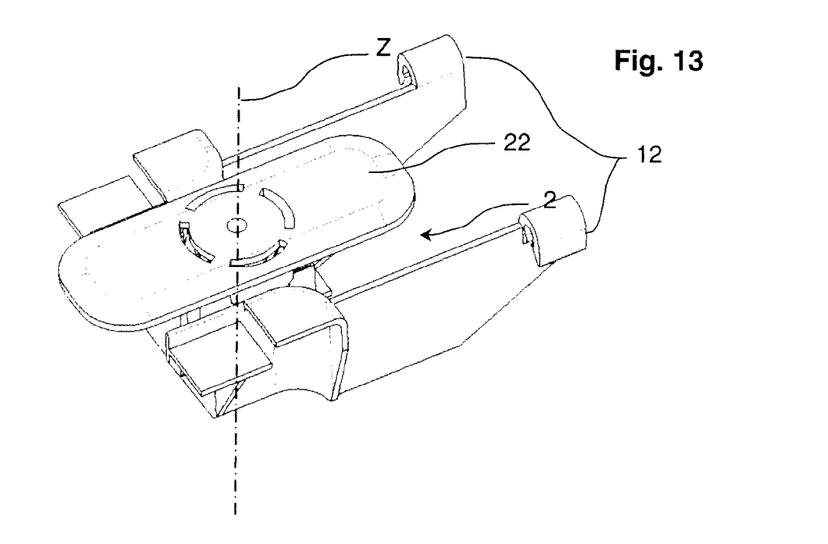

According to a particular embodiment of the invention as represented in FIGS. 10 and 11, the bearing surface 31 is of concave shape. The bearing surface 31 preferably has a conical shape. The operating means 21 comprise a rod having a pointed end. When the detection device is in an inactive detection state, the end of the operating means 21 is located inside the cone, more precisely at the peak of the cone at the level of the contact point C. The peak of the cone is preferably on the axis of movement Z. When the off-centre actuating force FA is applied to the movable operating device 2, the latter swivels and the end of the operating means 21 tends to move along the slope of the cone. According to this embodiment represented in FIGS. 10 and 11, on account of the displacement factors Fd1, Fd2, for a given actuating force FA, the displacement AZ of the operating device 2 tends to be maximized.

Figure 8:
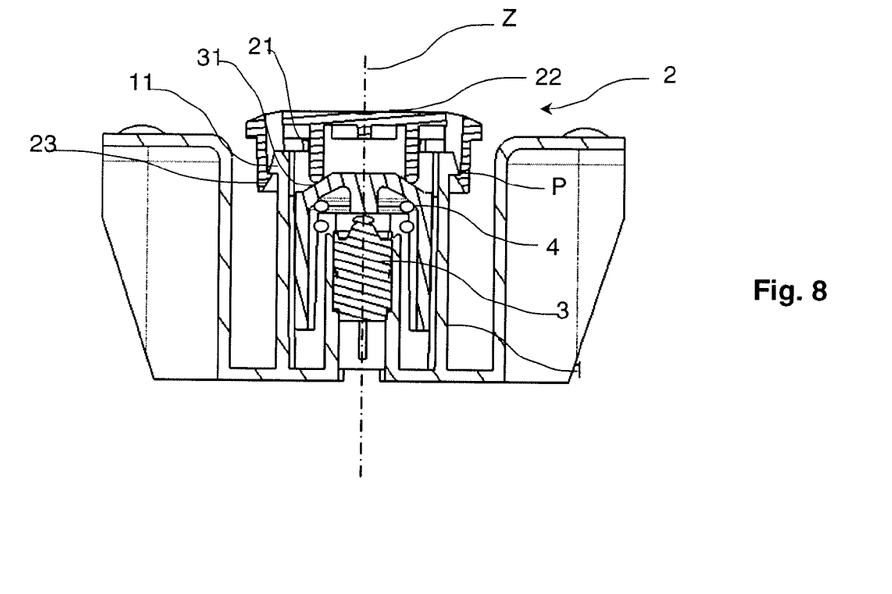
FIGS. 8 to 9 represent alternative embodiments of a detection device according to FIGS. 5 to 7.
Figure 9:
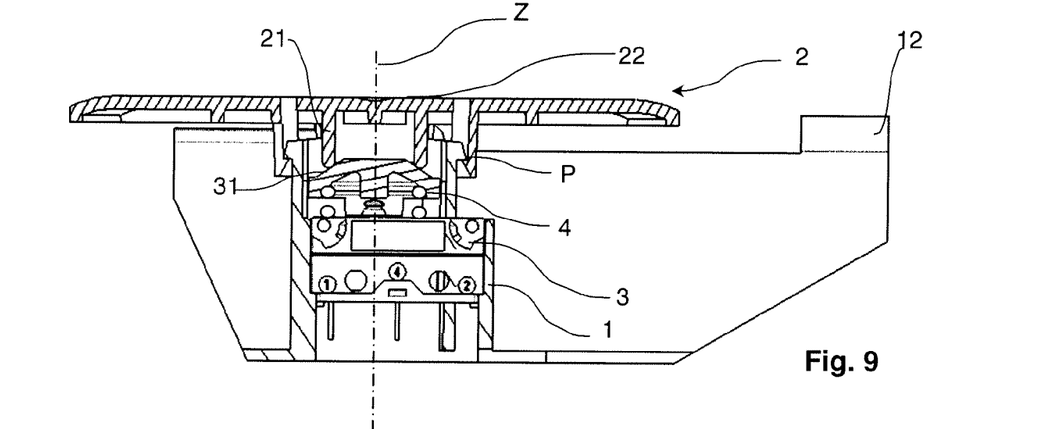

The same effect is obtained with a second particular embodiment of the invention as represented in FIGS. 8 and 9. The bearing surface 31 of the electric contact is of convex shape. The bearing surface 31 preferably has a conical or frustum shape. The operating means 21 comprise a hollow rod. When the detection device is in an inactive detection state, the end of the operating means 21 is preferably located at the foot of the cone.

According to an alternative embodiment, not represented, said end of the operating means 21 is not in contact with the contact surface 31 of the electric contact 3 when the detection device is in an inactive detection state. Said end of the operating means 21 comes into contact with the contact surface 31 of the electric contact 3 only after the operating device 2 has moved.

When the detection device is designed to be used in a seat, the actuating force FA is generally due to deflection of the seat caused by the presence of a person or an object on the seat. The detection device can in particular be placed under the seating surface of the seat. Deformation of the seating surface of the seat in the presence of a person in particular leads to movement of the movable operating device 2. As the contact 3 is generally connected to processing and analysis means, not represented, the closing signal resulting from the change of electric state of the contact can be analyzed by said processing means. The retaining force FM dependent on the stiffness of the spring 4 can be chosen according to the required detection threshold.

In an automobile-related application, the application point of the actuating force FA is not known precisely and the intensity of the actuating force FA is not mastered. Indeed, for a given seat, these two parameters respectively depend essentially on the weight of the passenger and on his or her position on the seat. It is desirable, for a given passenger sitting at a place on the seat, for the contact surface 31 to move over the whole actuating travel CA for detection to be able to take place. In other words, the actuating force FA has to be sufficient to oppose the retaining force FM whatever its application point A. This has to be verified whatever the weight of the passenger and whatever his or her position on the seat. It is desirable that the detection device be operational in a large number of situations.

According to a particular embodiment, the detection device comprises securing means 12 designed to secure said device on an external support, not represented. According to this development of the invention, the securing means 12 are more particularly designed to secure the detection device on the seat of an automobile vehicle. The external support is then mainly composed of a lattice constituting one of the elements of a bearing structure of an automobile vehicle seat. The securing means 12 then comprise at least one hook fixed onto one of the meshes of the lattice. At the time the detection device is fixed onto the external support, in particular onto the meshes of the lattice of the vehicle seat, the hooks of the securing means 12 couple with the meshes of the lattice.

The detection device is particularly designed to be combined with a seat, in particular an automobile vehicle seat. The seat comprises at least a deformable seating surface on which a person is to sit. The seating surface comprising a deformable foam is joined to a rigid frame designed to be fixed to a vehicle. The detection device as defined above is positioned under the seating surface so that the deformable foam can apply an actuating force on the movable operating device 2 at the moment deformation of the seating surface takes place. The detection device as defined above is preferably secured by these securing means 12. The deformable foam is preferably in contact with the movable operating device 2.

The detection device is connected to analysis means of the vehicle. The data supplied by said detection device can be combined with analysis of other functional parameters of a vehicle.

According to a particular embodiment of the seat, the deformable foam is in direct contact with the operating surface 21 of the movable operating device 2.

According to an alternative embodiment of the seat, said seat comprises a backrest in which a detection device as described above is positioned. The detection device tends to detect a deformation of a first part of the backrest with respect to a second part of the backrest.

The invention claimed is:

1. A detection device comprising:
 a body (1) comprising an electric contact (3) having at least two electric operating states,
 a movable operating device (2) having at least two operating positions and connected to the body (1) by:
  a slidable connection permitting movement of the movable operating device (2) in translation with respect to the body (1) along an axis of movement (Z), and at least one swivel connection enabling the operating device (2) to swivel with respect to the body (1) around at least one pressing point (P), said pressing point (P) of said at least one swivel connecting being off-center with respect to the axis of movement (Z), wherein movement of the movable operating device (2) will actuate the electric contact (3), so that said at least one pressing point (P) is between the movable operating device (2) and the body (1), and the movable operating device comprises an operating means (21) one end of which is designed to collaborate with the contact surface (31) at the level of a contact area (C) to actuate a change of electric operating state of said electric contact (3) by pressing directly on said contact surface (31).

2. The detection device according to claim 1, characterized in that a first distance (PCx) between the contact area (C) and the pressing point (P) is greater than a second distance (PZx) between the pressing point (P) and the axis of movement (Z), said distances (PCx) and (PZx) corresponding to the actual distances projected onto a plane (XY) perpendicular to the axis of movement (Z).

3. The detection device according to claim 1, characterized in that a first distance (PCx) between the contact area (C) and the pressing point (P) is smaller than a second distance (PZx) between the pressing point (P) and the axis of movement (Z), said distances (PCx) and (PZx) corresponding to the actual distances projected onto a plane (XY) perpendicular to the axis of movement (Z).

4. The detection device according to claim 1, characterized in that a third distance (PCz) between the contact area (C) and the pressing point (P) in a plane (XZ) parallel to the axis of movement (Z) is zero.

5. The detection device according to claim 1, characterized in that a third distance (PCz) between the contact area (C) and the pressing point (P) in a plane (XZ) parallel to the axis of movement (Z) is greater than zero.

6. The detection device according to claim 1, characterized in that the contact surface (31) is perpendicular to the axis of movement (Z).

7. The detection device according to claim 1, characterized in that the contact surface (31) is inclined with respect to the axis of movement (Z).

8. The detection device according to claim 7, characterized in that the contact surface (31) is of concave shape.

9. The detection device according to claim 7, characterized in that the contact surface (31) is of convex shape.

10. The detection device according to claim 8, characterized in that the contact surface (31) is of conical shape.

11. The detection device according to claim 1, characterized in that the movable operating device (2) is connected to the body (1) by at least four pressing points (P) respectively each allowing said movable operating device (2) to swivel with respect to the body (1) on a swivel connection.

12. The detection device according to claim 11, characterized in that the pressing points (P) between the operating device (2) and the body (1) are arranged uniformly over the periphery of the body (1).

13. The detection device according to claim 11, characterized in that the movable operating device (2) comprises a flange (23) pressing on a rim (11) of the body (1) and enabling said movable operating device (2) to swivel with respect to the body (1).

14. The detection device according to claim 1, characterized in that the movable operating device (2) is held in a first operating position with respect to the body (1) by holding means (4), said holding means (4) exerting a retaining force (FM) opposing movement of the operating device (2) with respect to the body (1) from the first operating position to a second operating position.

15. The detection device according to claim 14, characterized in that the holding means (4) comprise a spring.

16. The detection device according to claim 14, characterized in that the holding means (4) exert the retaining force (FM) on the movable operating device (2) via the contact surface (31) of the electric contact (3).

17. A seat comprising at least a deformable seating surface for a passenger to sit on, and a rigid frame designed to be fixed to a vehicle, characterized in that at least one detection device according to claim 1 is placed in the seat so as to detect deformations of said seat.

18. The seat according to claim 17, characterized in that said at least one detection device is secured under the seating surface of the seat by securing means (12), the seating surface comprising a deformable surface commanding movement of the movable operating device (2) with respect to the body (1) to the second operating position.

19. The seat according to claim 18, characterized in that the deformable surface is in contact with the movable operating device (2).

20. A seat comprising a backrest, characterized in that a detection device according to claim 1 is positioned in the backrest to detect a deformation of a first part of the backrest with respect to a second part of the backrest.

* * * * *